(12) United States Patent
Wilkins, Jr. et al.

(10) Patent No.: US 6,879,886 B2
(45) Date of Patent: Apr. 12, 2005

(54) FLIGHT GUIDANCE SYSTEM PROVIDING PERSPECTIVE FLIGHT GUIDANCE SYMBOLOGY

(75) Inventors: Robert Ryan Wilkins, Jr., Greenville, DE (US); Kenneth Scott Harris, Wilmington, DE (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/376,914

(22) Filed: Feb. 27, 2003

(65) Prior Publication Data

US 2004/0015274 A1 Jan. 22, 2004

Related U.S. Application Data

(63) Continuation-in-part of application No. 09/975,624, filed on Oct. 11, 2001.

(51) Int. Cl.[7] .............................. G06F 7/70; G06G 7/76
(52) U.S. Cl. ............................... 701/3; 701/14; 701/15; 701/16; 701/120; 340/947; 340/980; 342/63; 342/65; 345/805; 345/855
(58) Field of Search ...................... 701/15–16, 23–26, 701/300–301, 3–4, 8, 10, 14, 18, 120–122, 207–208, 211, 213–215; 340/947, 958, 961, 963, 971–980, 990, 995.1, 995.17, 995.18, 995.2, 995.22, 945; 342/29, 33–35, 63–64, 176, 182; 345/804–805, 848, 850–855, 619

(56) References Cited

U.S. PATENT DOCUMENTS

| | | | | |
|---|---|---|---|---|
| 5,420,582 A | * | 5/1995 | Kubbat et al. | 340/974 |
| 5,745,863 A | * | 4/1998 | Uhlenhop et al. | 701/14 |
| 5,838,262 A | | 11/1998 | Kershner et al. | 340/945 |
| 5,936,552 A | * | 8/1999 | Wichgers et al. | 340/963 |
| 5,995,901 A | * | 11/1999 | Owen et al. | 701/202 |
| 6,005,581 A | * | 12/1999 | Gjullin | 345/582 |
| 6,021,374 A | | 2/2000 | Wood | 701/301 |
| 6,154,151 A | * | 11/2000 | McElreath et al. | 340/970 |
| 6,496,760 B1 | * | 12/2002 | Michaelson et al. | 701/3 |
| 2002/0099528 A1 | * | 7/2002 | Hett | 703/13 |
| 2003/0023354 A1 | * | 1/2003 | Brust et al. | 701/3 |

FOREIGN PATENT DOCUMENTS

DE 2458664 A * 6/1976 ............. G01S/7/20

OTHER PUBLICATIONS

Wilkins, Robert R., Jr., "Use of Predictive Perspective Guidance Displays for Increased Situational Awareness" presented at the American Helicopter Society 57th Annual Forum, Washington, D.C., May 9–11, 2000.

* cited by examiner

Primary Examiner—Jacques H. Louis-Jacques
(74) Attorney, Agent, or Firm—Harness Dickey & Pierce P.L.C.

(57) ABSTRACT

A flight guidance system providing perspective flight guidance symbology using positioning and terrain information provides increased pilot situational awareness of an aircraft. The guidance system uses a positioning system and a detailed mapping system to provide a perspective display for use in an aircraft. A Perspective Flight Guidance (PFG) symbology set is thereby displayed on a pilot display. The PFG symbology set includes broken line symbols representing an open tunnel and providing flow field data, a half-bracket symbol to indicate that the aircraft is no longer in the open tunnel represented by the broken line symbols and a quickened flight path vector (QFPV) symbol to provide the pilot with predictive flight path information.

19 Claims, 5 Drawing Sheets

FIG. 1

OFF COURSE BRACKET SYMBOL

FLIGHT GUIDANCE SYSTEM PROVIDING PERSPECTIVE FLIGHT GUIDANCE SYMBOLOGY

CROSS-REFERENCE TO RELATED APPLICATIONS

This application is a continuation-in-part of U.S. patent application Ser. No. 09/975,624 filed Oct. 11, 2001 and entitled "PRECISION PERSPECTIVE FLIGHT GUIDANCE SYMBOLOGY SYSTEM", the entire disclosure of which is hereby incorporated herein by reference.

STATEMENT REGARDING FEDERALLY SPONSORED RESEARCH

The invention described herein was made in the performance of work under NRTC-RITA Cooperative Agreement No. NCCW-0076 WBS 00D-RITA-05-10-P2 and the U.S. Government may have certain rights thereto.

FIELD OF THE INVENTION

The present invention relates generally to aircraft guidance systems, and more particularly to terrain following/terrain avoidance systems using perspective flight guidance information.

BACKGROUND OF THE INVENTION

In order to reduce tracking errors and pilot workload, a pilot may be provided with increased situational awareness of an aircraft with respect to a desired flight path. In particular, a pilot must be aware of the actual aircraft performance, or flight path vector (FPV), the desired or commanded aircraft performance, and the predicted aircraft performance. The use of a perspective display with a predictive flight path or performance symbology set provides increased situational awareness. Perspective displays with predictive symbology permit a pilot to "see" what will be required or demanded of the aircraft to maintain a desired flight path, as well as where the aircraft will be in a finite period of time. With the increased situational awareness, the pilot's workload is lower, thereby permitting better flight management.

Flight director guidance for critical maneuvers, such as those maneuvers with very small or reduced margins for error, is often essential for precision navigation requirements. Current flight guidance display sets utilize symbology that is based on compensatory tracking tasks or follow a guidance cue to satisfy (i.e., null) an error signal. Further, current generations of terrain flight guidance systems use radiated emissions and track errors displayed using compensatory tracking symbology (e.g., Delta-Veebar and Two-bar). Such systems operate satisfactorily, but are limited in their ability to display future flight path information to the pilot and/or the results of pilot control input. The display symbology sets are designed to follow command guidance from an off-course situation to return to a nominal (i.e., null error) solution, known as a compensatory tracking task. Thus, such displays cause much "mental gymnastics", cognitive processing, and pilot mental workload, which may lead to additional error.

This traditional symbology used for instrument approaches in vertical flight aircraft, such as rotorcraft or tiltrotors, is based on compensatory tracking tasks. Compensatory tracking tasks are derived by monitoring actual aircraft performance against commanded performance during flight and actual cross-track error against commanded cross-track during flight. Guidance errors are generally computed as the difference between guidance commands and sensed aircraft state. The errors are sent to flight director controls, which generate steering commands. These commands appear as flight director symbology on a cockpit display and direct the pilot where to position the lateral stick (roll), thrust control lever (power), and the longitudinal stick (pitch). If the pilot responds with the appropriate control inputs to satisfy the flight director steering commands, the aircraft will converge on the reference values selected.

Symbology based on compensatory tracking tasks is designed to provide the pilot with command guidance instructing a pilot to make flight adjustments to guide an aircraft from an off-course situation to return to a nominal or null error solution. However, compensatory tracking symbology does not provide the pilot with information indicating how far the aircraft is off course or what flight control input is required to regain course centerline. Therefore, the pilot must constantly monitor flight commands and the results of control inputs.

Furthermore, compensatory tracking does not provide flight path predictability, and displays that utilize compensatory symbology typically require more cognitive processing by the pilot. This causes heavy pilot mental workload that may lead to errors, especially in high workload constrained terminal areas or during low altitude operations. For example, excessive pilot mental workload can lead to full-scale deflection errors or total loss of situational awareness resulting in a maximum deviation mandated missed approach. Thus, compensatory symbology often creates display clutter and high pilot cognitive workload, which increases the risk of flight technical errors (FTE's).

To overcome the shortcomings of guidance systems and symbology based on compensatory tracking tasks, perspective display sets, or three-dimensional (3D) displays, have been developed. Most perspective display sets provide 3D tunnels consisting of a series of rectangles connected by lines through the corners. In particular, perspective display sets are useful for terrain following/terrain avoidance (TF/TA) flights that require accurate elevation and obstacle data for use by aircraft flight director systems to provide the pilot with immediate, real-time flight guidance information. The traditional systems for providing this information and the symbology used for TF/TA aircraft attitude-based operations and "null command" compensatory tracking systems are based on radiated/returned sensor data.

Current methodology for guidance for TF/TA operations utilize energy-emitting radiation systems or a multi-mode radar to provide a real-time display of terrain/obstacles ahead of the aircraft. These systems, while accurate, are limited in that the display and data are restricted by the performance of the sensor system. For example, turning limitations from the turn rate/bank angle limiter on some multi-mode radars precludes the system from "seeing" around or into the turn. Further, and for example, current sensor-based systems cannot provide the pilot with reliable "nose over" cueing to enable terrain flight because the emitter sensor cannot "look over" the terrain ahead, but must rely on line-of-sight (LOS) operation.

It is desirable to develop a system and perspective display set that yields better performance results than current navigation systems and perspective symbology sets, as well as providing look ahead functionality and increased situational awareness, causing less display clutter, reducing pilot work load and reducing FTE's.

SUMMARY OF THE INVENTION

An aircraft guidance system of the present invention provides flight path vector (FPV) navigation using known terrain elevation data (e.g., calculated elevation data). Using pathway guidance cognitive processing, the workload required to safely complete terrain following/terrain avoidance (TF/TA) flight at low-altitudes (e.g., between 300–500 feet above ground level) is minimized.

In particular, a guidance system of the present invention attempts to prevent inadvertent flight into terrain and allows terrain-hugging flight to limit intervisibility using terrain elevation data contained within, for example, a digital map system, updated aircraft inertial track data from flight guidance computers and differential global positioning system (dGPS) navigation systems. This information is used in combination with generated perspective flight guidance symbology to enable a pilot to view visual representations of upcoming and lateral terrain.

The system provides a Perspective Flight Guidance (PFG) display that, in one embodiment, utilizes dGPS for waypoint geolocation, combined with a "quickened" predictive FPV symbol and "tunnel-in-the-sky" pathway guidance. The display enables pilots to anticipate avoidance flight requirements, thereby permitting the pilots to fly low to the ground (i.e., terrain flight) while avoiding obstacles (i.e., terrain avoidance) with increased accuracy, reduced intervisibility and reduced workload.

In one embodiment of the present invention, an aircraft guidance system includes a receiver for receiving aircraft position information, a database providing terrain information for use in combination with the aircraft position information to provide a guidance profile, and a display for displaying guidance information based upon the guidance profile. The guidance profile may be a terrain following guidance profile and the guidance information may be configured to be displayed as a PFG symbology set.

In another embodiment of the present invention, an aircraft guidance system for use in terrain following flight includes a GPS receiver for receiving aircraft position information, an air data system providing aircraft altitude information, a database providing terrain information for use in combination with the aircraft position information and aircraft altitude information to generate a terrain following guidance profile, and a display (e.g., pilot display) for displaying guidance information based upon the terrain following guidance profile. The terrain flight guidance information is preferably configured to be a three dimensional precision pathway.

Further areas of applicability of the present invention will become apparent from the detailed description provided hereinafter. It should be understood that the detailed description and specific examples, while indicating certain preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Although the present invention is described in connection with specific systems operating to provide particular displays, it is not so limited, and the present invention may be provided in connection with other systems providing different or additional displays.

Figure 1:
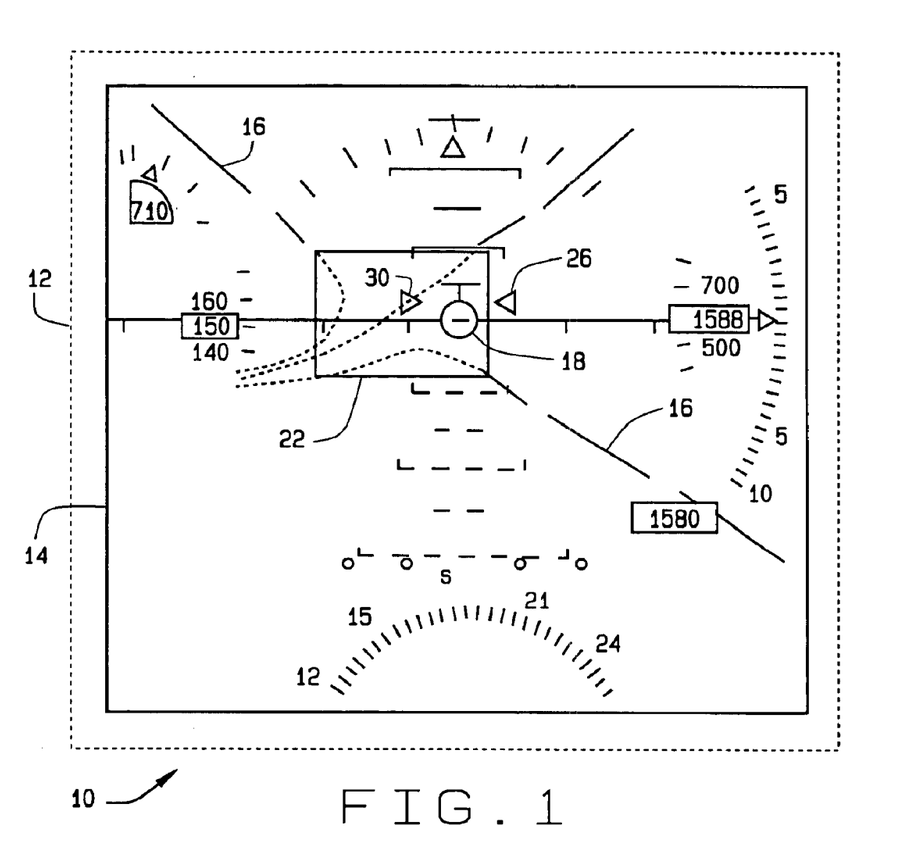
FIG. 1 is a graphical representation of a predictive flight path symbology system including an FPV based Perspective Flight Guidance (PFG) symbology set in accordance with one embodiment of the present invention.

Referring to FIG. 1, a graphical representation of a predictive flight path symbology system 10 in accordance with an exemplary embodiment of the present invention is shown. The system 10 includes a flight path vector (FPV) based Perspective Flight Guidance (PFG) symbology set 12 and a pilot display 14 on which the PFG symbology set 12 is displayed. The PFG symbology set 12 includes an open tunnel bounded by broken tunnel lines 16 that provides flow field data, such as, for example a Boeing Philadelphia broken line open tunnel; a quickened flight path vector (QFPV) symbol 18 that indicates predictive aircraft state and a quickened command reference frame 22 symbol into which a pilot is to place the QFPV symbol 18. Additionally, the PFG symbology set 12 includes a pitch trim cue or symbol 26, such as, for example, a NASA Ames longitudinal trim command cue, that is utilized by the pilot to maintain a desired aircraft pitch, and a power trim cue or symbol 30, such as, for example, an Ames power cue, that is utilized by the pilot to maintain a desired trim on the aircraft. An inertial-referenced trend indicator algorithm is used to "look ahead" along the predicted aircraft track. This trend information is displayed on the HSD and used to build the tunnel.

Figure 3:
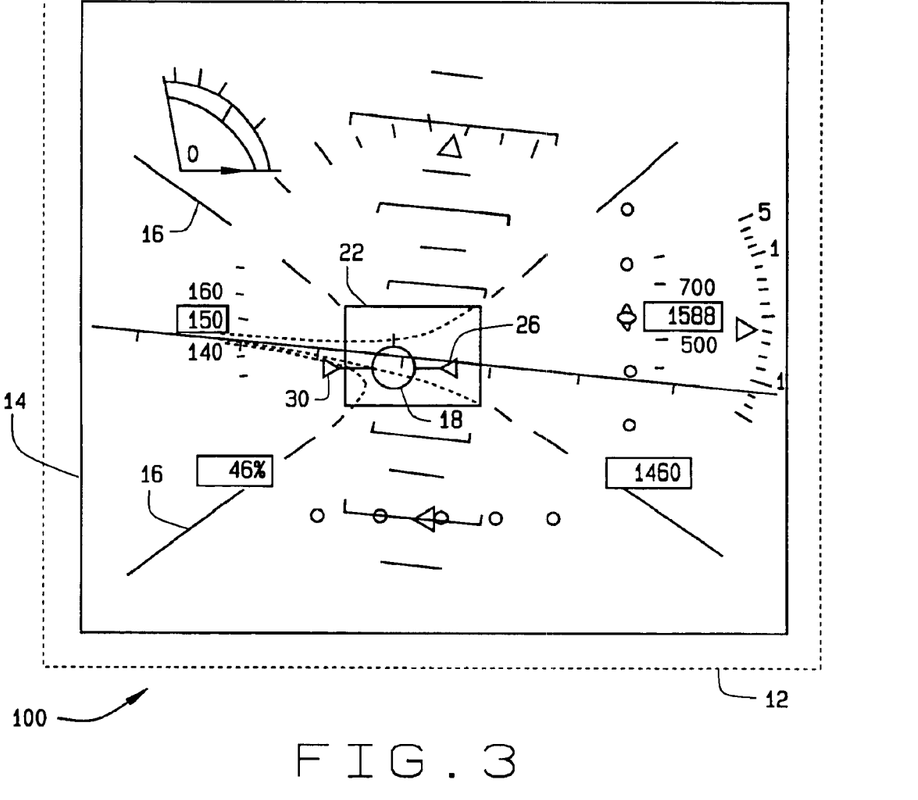
FIG. 3 is a graphical representation of the predictive flight path symbology system shown in FIG. 1 utilized with a 3D database.
Figure 7:
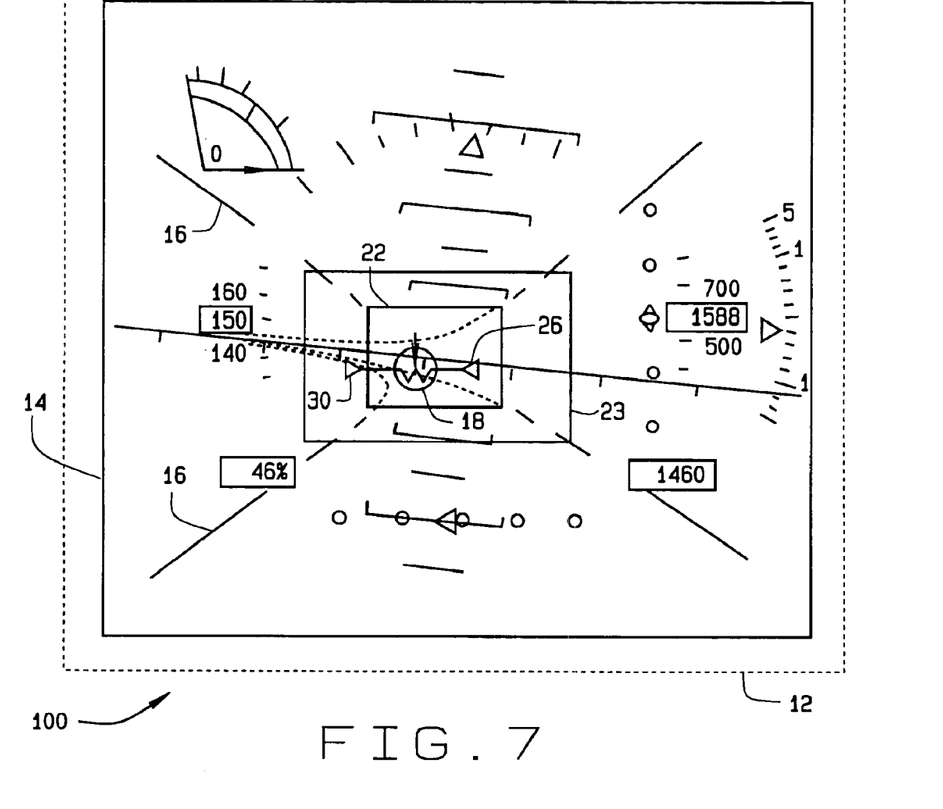
FIG. 7 is a graphical representation of another embodiment of a predictive flight path symbology system utilized with a 3D database.
Figure 11:
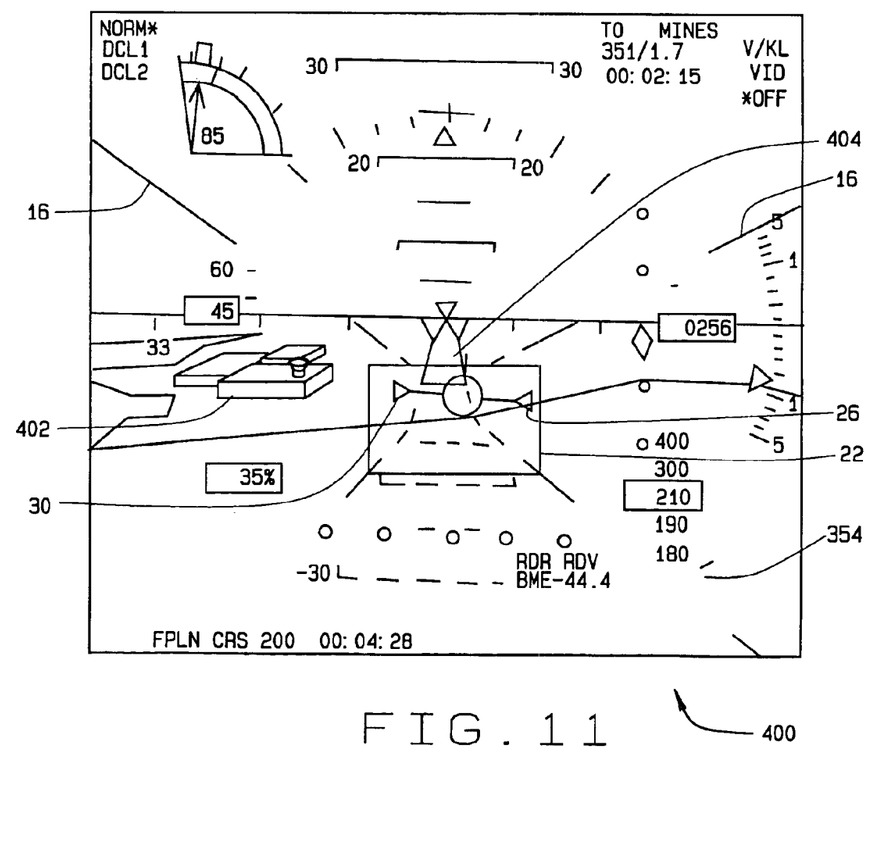
FIG. 11 is an exemplary display showing one embodiment of a multi-layered display of the present invention having a predictive flight path symbology system overlaying a representation of a three-dimensional terrain.

The PFG symbology set 12 provides pilots of rotorcraft/tiltrotor aircraft, or any suitable airborne platform, with an intuitive symbology set. Using a high resolution two dimensional (2D) database (not shown), or three dimensional (3D) database (not shown), as described in more detail herein, the PFG symbology set 12 combines precision waypoint geolocation with quickened predictive flight-path-vector and "tunnel-in-the-sky" pathway guidance. A 2D database displays the PFG symbology set 12 either overlaying a map type display or accompanied by a map type display, as shown in FIG. 1. A 3D database displays the PFG symbology set 12 either overlaying a synthetic vision type display or accompanied by a synthetic vision type display, as shown in FIGS. 3, 7 and 11 described below. Waypoint geolocation can be determined by any suitable positioning system, such as a global positioning system (GPS) or differential GPS (dGPS).

When employed on an aircraft guidance display, the PFG symbology set 12 presents a fully anticipatory perspective display, wherein the pilot has a pictorial display of the path (e.g., flight path) to follow. The PFG symbology set 12 provides a tunnel type guidance system, which requires reduced pilot cognitive process because a pilot merely needs to "stay between the lines." For example, the PFG symbology set 12 may show an above glide slope condition indicating a requirement to increase descent gradients and reduce power and/or increase rate of descent. The PFG symbology set 12 is anticipatory, such that it shows the pilot exactly where he/she is, and needs to be, thereby providing the pilot with an immediate indication of aircraft reaction to any control input, and immediately whether the control input satisfies a required demand.

The QFPV symbol 18 is quickened, such that the QFPV symbol 18 is temporally placed at a finite distance or period of time ahead of the aircraft. Thus, the QFPV symbol 18 identifies (e.g., points to) where the aircraft will be at that fixed future moment in time. This allows the pilot to anticipate the direction and amount of control input required to fly a required path or track, as well as the predicted result of that input.

As shown in FIG. 1, the open tunnel bounded by broken lines 16 displays a predetermined amount of the tunnel or pathway, thereby reducing display clutter. For example, a predetermined time period (e.g., sixty seconds) of the tunnel is displayed. Broken lines 16 provide flow field data. The tunnel or pathway provides anticipatory flight control input cues to the pilot by banking, climbing, descending, and turning as the pathway turns and descends or climbs. To fly the pathway, pilots keep the QFPV symbol 18 within the quickened command frame 22, which is displayed temporally in front of the aircraft, for example 4.5 seconds. In one exemplary embodiment, tunnel height and width follow a four-fifths format that is linear as a function of airspeed. For example, tunnel height and width will vary from a maximum of 400×500 feet at air speeds above 250 KCAS to a minimum of 100×125 feet at air speeds less than or equal to 50 KCAS.

In particular, the quickened command frame 22 is quickened to be a predetermined fixed distance or time period ahead of the aircraft path and to be cotemporal and coplanar with the QFPV symbol 18. Additionally, the quickened command frame 22 remains displayed at the fixed distance or period of time in front of the aircraft regardless of air speed. The quickened command frame 22 is used to indicate a command location in which the pilot places the QFPV symbol 18 to satisfy tracking requirements.

A pitch trim cue 26 and power command cue 30 are preferably displayed as command triangles at the ends of the QFPV symbol 18. Specifically, the pitch trim cue 26 is used to indicate the proper longitudinal pitch needed to maintain the QFPV symbol 18 within the quickened command frame 22. In one embodiment, the pitch trim cue 26 is an orange delta displayed adjacent a right wing of the QFPV symbol 18. The pitch trim cue is a "FLY TO" command. The pilot maintains a desired pitch of the aircraft by maneuvering the aircraft so that the right wing of the QFPV symbol 18 remains aligned with the pitch trim cue 26. The power command cue 30 is used to indicate power requirements needed to maintain the QFPV symbol 18 within the quickened command frame 22. In one embodiment, the power command cue 30 is a yellow delta adjacent a left wing of the QFPV symbol 18. The pilot maintains a desired power trim of the aircraft by maneuvering the aircraft so that the left wing of the QFPV symbol 18 remains level with the power trim cue 30. The power command is a "NULL or FLY FROM" command.

In one embodiment, the power command cue 30 moves within a range above and below the QFPV symbol 18 (e.g., ±0.85 inches above/below). Motion above the QFPV symbol 18 is an indication to reduce the thrust control lever (TCL), and motion below the QFPV symbol 18 is an indication to increase the TCL. The pitch trim cue 26 also moves within a range above and below the QFPV symbol 18 (e.g., ±1.25 inches above/below). Motion above the QFPV symbol 18 is an indication to pull back on pitch cyclic (i.e., trim up/aft), and motion below the QFPV symbol 18 is an indication to push forward on pitch cyclic (i.e., trim down/forward). By using the pitch trim cue 26 and the power command cue 30, a pilot nulls both a longitudinal trim command and a power command, thereby satisfying requirements to hold airspeed and altitude.

Figure 2:
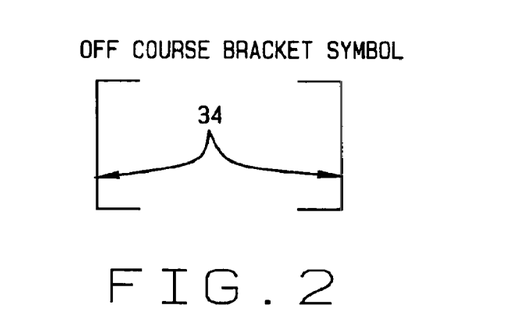
FIG. 2 shows a half bracket symbol included in the PFG symbology set shown in FIG. 1.

FIG. 2 shows a half bracket symbol 34 included in the PFG symbology set 12 (shown in FIG. 1). FIG. 2 shows the half bracket 34 in two configurations. In a first configuration, the half bracket 34 is shown having legs extending in a first direction, for example right or down. In the second configuration, the half bracket 34 is shown having legs extending in a second direction opposite the direction shown in the first configuration, for example left or up. The half bracket 34 indicates when the pilot is out of the tunnel. The half bracket 34 is designed to be directional such that the half bracket 34 indicates whether the tunnel is above, below, left, or right. By knowing were the tunnel is with respect to the aircraft, the pilot can redirect the aircraft so that the QFPV symbol 18 (shown in FIG. 1) re-intercepts the tunnel. When a pilot utilizes the half bracket 34 to guide the aircraft on a flight path that will cause the QFPV symbol 18 to re-intercept the tunnel, as the aircraft reaches a reciprocal heading, i.e. 180° of turn away from the tunnel, the half bracket 34 will convert from the first configuration to the second configuration, thereby indicating that the pilot is now turning toward the tunnel. For example, when the pilot utilizes the half bracket 34 having the first configuration, when the aircraft reaches a reciprocal heading, the half bracket 34 will convert to the second configuration.

FIG. 3 shows a graphical representation of a predictive flight path symbology system 100 of the present invention, including an FPV vector based PFG symbology set 12 (shown in FIG. 1) utilized with three-dimensional data stored within a database 204 (shown in FIG. 5) as described in more detail herein. Components in FIG. 3 identical to components in FIG. 1 are identified in FIG. 3 using the same reference numerals as used in FIG. 1. While the two dimensional (2D) display illustrated in FIG. 1 uses 2D data to provide a display in two dimensions, for example height and width, three dimensional (3D) data is used to provide the display in FIG. 3 and provides a display in three dimensions, for example height, width and depth, thereby depicting objects with perspective. When the PFG symbology set 12 is utilized with 3D data, the PFG symbology set 12 may be displayed either overlaying a synthetic vision type display or accompanied by a synthetic vision type display. Overlaying the PFG symbology set 12 on a synthetic vision display allows the pilot to not only see the course to fly, but the relationship of the underlying terrain. Therefore, this reduces the visual and mental interpretation required by the pilot.

It should be noted that while embodiments of the symbology set of the present invention are especially suited for use in aircraft performing steep approach angles, or aircraft required to descend and decelerate to a hover, or near hover, the embodiments are not limited to such applications and are applicable for use in any aircraft. Thus, the PFG symbology set 12 may be designed and implemented to replace traditional, workload intensive, Two-Bar and Delta-Veebar flight director terminal approach guidance, while providing smaller FTE and reduced pilot workload.

Thus, various embodiments of a predictive flight path symbology system 10, 100 include dashed or broken lines 16 that define the corners of a tunnel to provide the temporal effects of motion through the tunnel (e.g., flow field effects) and aircraft speed relative to the tunnel. For example, the broken lines 16 may represent 150 feet in length with 150 feet of space therebetween. Further, the broken lines 16 project the tunnel for a predetermined period of time (e.g., 60 seconds) ahead of the aircraft current position to provide the predictive nature of the tunnel. In operation, the various embodiments of a predictive flight path symbology system 10, 100 and the PFG symbology set 12 provide an instrument approach guidance symbology system that enables pilots to execute steep (i.e., >4° glide slope) and normal (i.e., ≦4° glide slope) precision instrument approaches during, for example, instrument meteorological conditions (IMC) and/or instrument flight rules (IFR) flight. Additionally, the PFG symbology set 12 enables a pilot to execute normal IMC flight, IFR flight, and low-altitude TF/TA in near zero visibility.

Having described various embodiments of a PFG symbology set 12 of the present invention, one embodiment of a control system for use in generating such a symbology set will now be described. In particular, and for example, a PFG symbology set 12 including TF/TA symbology may be generated using a control system as described herein and provided on a display. In general, various embodiments of a Perspective Flight Guidance Terrain Flight/Terrain Avoidance (PFG TF/TA) system of the present invention provide pilots with guidance information having an intuitive symbology set. This guidance system is provided using a high resolution 3D or 4D-like database. In one embodiment, the PFG symbology 12 set provided as part of the guidance system utilizes dGPS for precision waypoint geolocation, and combined with the quickened predictive FPV and "tunnel-in-the-sky" pathway to provide an intuitive predictive flight path symbology system 100 (shown in FIG. 3).

Figure 4:
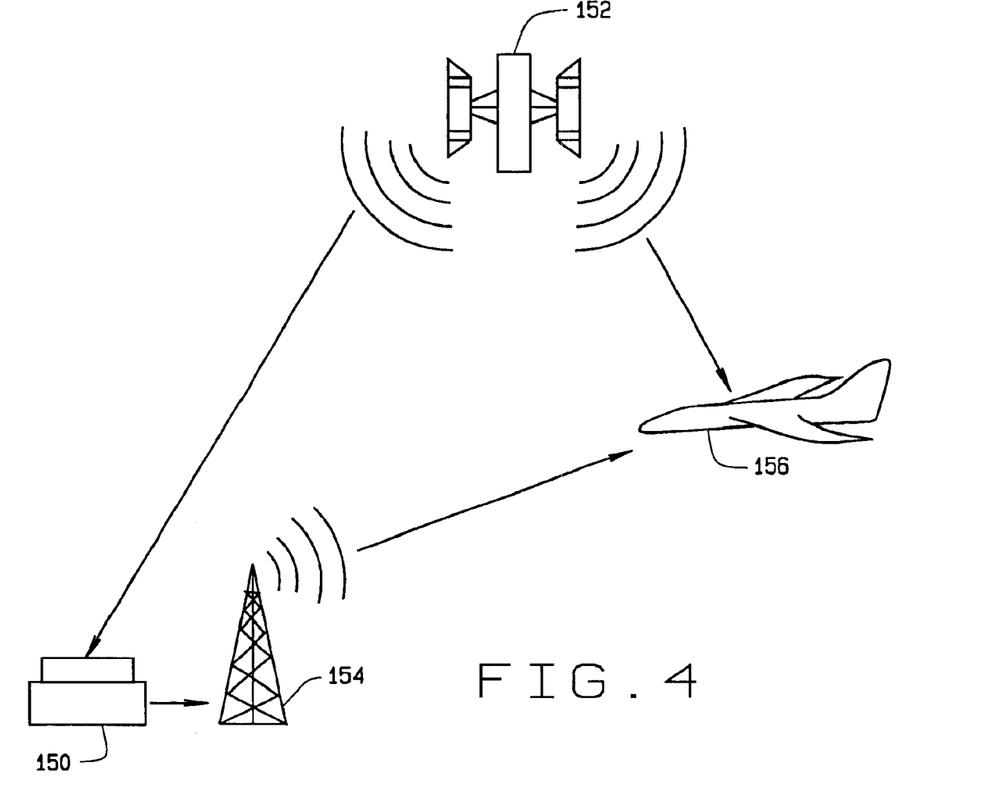
FIG. 4 is a simplified schematic diagram of a dGPS system in connection with which embodiments of the present invention may be implemented.

Specifically, and in one embodiment as shown in FIG. 4, dGPS is used to locate and update the position of the aircraft, which also provides for updating the display having the PFG symbology set 12. Typically, when using dGPS, a reference station 150 is provided at a known location. Using the reference station, errors in satellite signals can be determined. This is accomplished by measuring the distance to each of the satellites 152 using the signals received and comparing these measured distances to the actual distances measured from the known position of the reference station 150. The difference between the measured and calculated distance for each satellite 152 is the correction (i.e., differential correction) value. The differential correction values for each tracked satellite are transmitted by a transmitter 154 of the reference station 150 as a correction message. The correction message is received by a dGPS receiver (not shown) on-board an aircraft 156. These correction values are used to correct errors and improve accuracy of the GPS system and location data provided by the system. It should be noted that embodiments of the present invention are not limited to dGPS, but may be provided using GPS or other systems providing location information.

Figure 5:
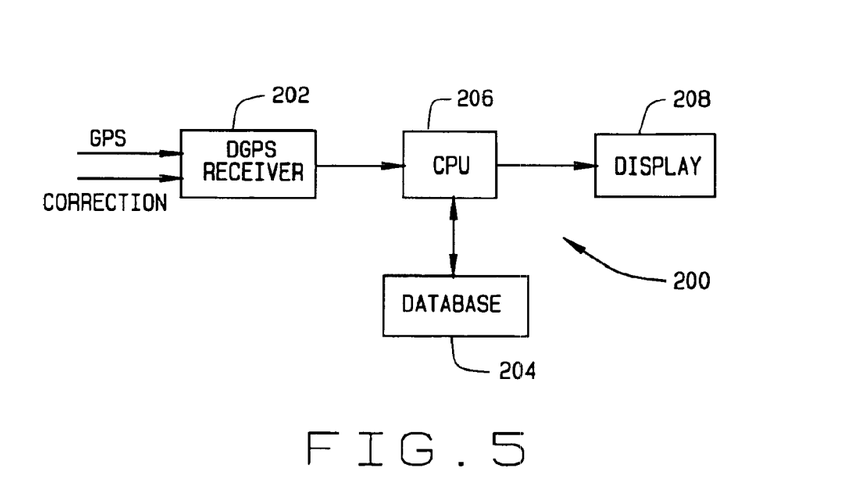
FIG. 5 is a simplified block diagram of one embodiment of a control system of the present invention.

Referring now to FIG. 5, and one exemplary embodiment of a control system 200 of the present invention, the control system includes a dGPS receiver 202 for receiving a dGPS signal providing the position or location of the aircraft 156, and a correction value as described herein. It should be noted that the correction value is received when the signal is a dGPS, but when other signals are used to track the aircraft (e.g., GPS signal), the correction value may not be provided. Specifically, the PFG symbology set 12 (e.g., TF/TA symbology) is driven by altitude data derived from a terrain digital map and digital feature analysis data/digital terrain elevation data (DFAD/DTED) within an on-board database 204. Aircraft position is provided by an inertial navigation system/dGPS (INS/dGPS) update of actual aircraft position using the GPS and correction value signals received by the dGPS receiver 202, which is then updated and validated against an actual digital map position and an INS predicted position. Specifically, terrain elevation data from a terrain digital map stored within the database 204 and aircraft altitude from an onboard GPS air data system and a radar altimeter is provided to aircraft flight data computers 206. The elevation data and aircraft altitude are then compared against predicted or required actual aircraft altitude and a selected or commanded low altitude clearance. Errors from commanded and actual, or predicted elevation and aircraft position are provided to the pilot as the base of the tunnel pathway to be flown as shown on a display 208 of the aircraft 156. Thus, terrain elevation data in combination with aircraft inertial track data from flight guidance computers and dGPS navigation systems are used to generate the tunnel pathway for display. It should be noted that the database 204 may contain any type of terrain or other digital map data as is known, and as needed or required. Further, this data may be updated periodically (e.g., monthly) or as desired or needed.

Figure 6:
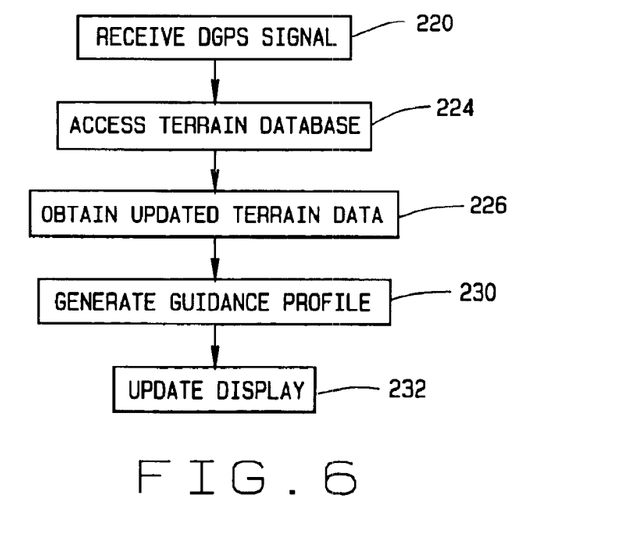
FIG. 6 is a flow chart of one embodiment of a control process implemented by a control system of the present invention for providing a predictive flight path symbology system including an FPV based PFG symbology set.

In a more preferred operation of the control system 200 and as shown in FIG. 6, at step 220 the dGPS receiver 202 receives aircraft position data such as the GPS and correction value signals, which are used to determine aircraft position. The database 204 is then accessed at step 224 to determine terrain data, including terrain elevation data for the received position (e.g., terrain elevation for a specific location stored in the database 204 and defined by a longitude and latitude). At step 226, updated terrain data, for example, from a terrain digital map and DFAD/DFTED terrain elevation data is obtained (e.g., details regarding the height of terrain at the particular location). Specifically, terrain elevation data from the terrain digital map and aircraft altitude from an air data system and a radar altimeter are provided to aircraft flight data computers 206. Then, at step 230, an updated guidance profile is generated for use in updating the predictive flight path symbology system 100 on the display 208 (e.g., to update the tunnel pathway). In particular, the elevation data and aircraft altitude are compared against predicted or required actual aircraft altitude, and a selected or commanded low altitude clearance (i.e., minimum clearance threshold) to determine a difference in the compared information (e.g., deviation from required actual aircraft altitudes). The display 208 is then updated (e.g., PFG symbology set and tunnel updated) at step 232 based upon the updated guidance profile (e.g., based upon the comparison). It should be noted that the tunnel may be generated using a tunnel generation component, for example, as described in co-pending U.S. patent application entitled "CONTROL SYSTEM PROVIDING PERSPECTIVE FLIGHT GUIDANCE" filed on Feb. 27, 2003 owned by the same assignee of the present invention and identified by attorney docket number 7784-000607, the entire disclosure of which is hereby incorporated by reference herein.

Thus, the dGPS receiver 202 receives aircraft position information (e.g., specific location information including longitude and latitude) which is used in combination with terrain digital map and terrain elevation data stored within the database 204 to generate a guidance profile. In particular, based upon the received aircraft position information, terrain digital map and terrain elevation data for that position is obtained from the database 204, which may include information regarding the height of the terrain and other ground features, navigational obstacles and navigational aids. This information for the specific position may be defined, for example, by terrain waypoints within the database 204 with aircraft position determined by waypoint geolocation using, for example, dGPS. This information is then used, for example, to update the display 208 including the predictive flight path symbology system 100 and the PFG symbology set 12 based upon the guidance profile defining the determined parameters for the display (e.g., tunnel profile).

In operation, using the predictive flight path symbology system 100 controlled by the control system 200 of the present invention, and for example, an operational TF/TA flight plan may be flown with terrain following operation having a simplified display symbology set (i.e., PFG symbology set 12). It should be noted that modifications to the predictive flight path symbology system 100 may be provided, including modification to the symbology and displays as needed or desired. For example, a selectable field of view (FOV) option for optimization of the tunnel display for different flight-directed modes may be provided. In particular, based on the constraints on tunnel size, aircraft speed, and command-frame look-ahead time to perform the TF/TA task, the FOV may be reduced from the nominal 75 degree view used to a 20 degree view in order to achieve an acceptable (e.g., larger) tunnel size on the display. This results in a magnification of the information within that region on the display 208.

Further, an FPV-centered display option may be provided to allow for centering of the display about the FPV, or alternatively about the waterline symbol. For example, during flight at extreme attitudes (e.g., steep approaches or slow speeds), centering of the display about the FPV brings the primary information back to the center of the display.

Additionally, and for example, as shown in FIG. 7, two frames may be displayed outlining the tunnel. A first frame 23 is a reference frame, which may be color coded (e.g., teal), and is shown co-temporal with the aircraft current position (i.e., aircraft nose). When compared to the aircraft waterline symbol, this first frame 23 shows the relative position of the aircraft 156 to the tunnel. The second frame is the quickened command frame 22, which also may be color coded (e.g., magenta), and is shown at some designated time in front of the aircraft 156 based on the current airspeed. The faster the aircraft 156 is moving, the further ahead in the tunnel, and thus smaller the quickened command frame 22 appears. The QFPV symbol 18 is quickened to make it cotemporal with the first frame 23, thus making it a predictor of the future aircraft position. Therefore, if the aircraft 156 is flown with the QFPV symbol 18 inside of the quickened command frame 22 then the aircraft flight path will stay within the confines of the tunnel.

The brackets 34 are also included on the display to allow for reacquiring the tunnel when the quickened command frame 22 disappears from the display. As shown, the brackets 34 preferably appear on the periphery of the Attitude Director Indicator (ADI) to indicate the direction the pilot should steer the aircraft 156 to reacquire the tunnel (i.e. when a bracket 34 appears on the left edge of the ADI, the pilot should steer the aircraft to the left to reacquire the tunnel). If the pilot is turning away from the tunnel, the aircraft will eventually reach a reciprocal heading. When this occurs, the bracket 34 will switch sides, indicating that the pilot is now turning in the correct direction to reintercept. Thus, as described herein, the brackets 34 indicate left/right and above/below position relative to the pathway. A heading tape may be added to the artificial horizon line for additional situational awareness.

Other modifications to the various embodiments of the invention are contemplated. For example, a modified command frame and broken lines 16 to reinforce to the pilot the different flight phase may be provided. In this embodiment, the top of the quickened command frame 22 and upper broken lines 16 are removed to indicate no ceiling to the operation. Also, the broken lines 16 and the quickened command frame 22 are color coded (e.g., orange) in a color to differentiate front-side of the approach from the back-side missed approach. The same quickening time element is utilized for this embodiment.

Figure 8:
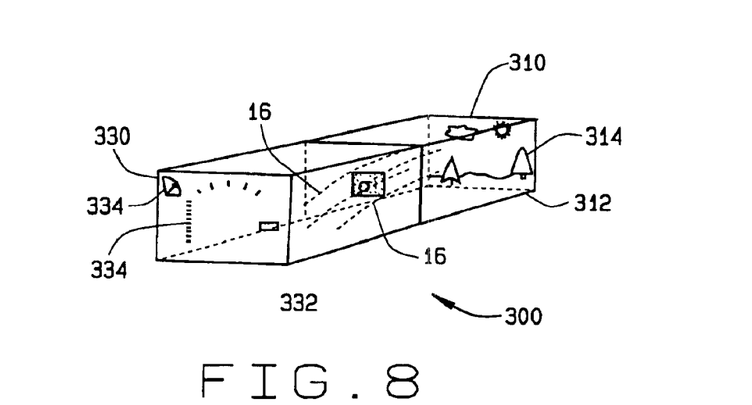
FIG. 8 is a block diagram of one embodiment of an exemplary multi-layered display according the present invention.

Further, embodiments of the present invention allow for displaying tunnel symbologies in combination with standard auxiliary symbologies and a synthetic vision type display (e.g., open flight database scene) using, for example, a multi-layered graphics approach 300 as shown generally in FIG. 8. In general, and shown therein, a first layer 310 is configured to provide a synthetic view, which may be a two-dimensional or three dimensional rendering of a view representative of terrain, including for example, obstacles such as mountains 312 and trees 314, over and around which an aircraft must maneuver. A second layer 320 overlays the first layer 310 and in a more preferred embodiment, provides graphics over the synthetic view. For example, the open tunnel bounded by broken tunnel lines 16, linear electronic attitude direction indicator (EADI), such as the quickened command reference frame 22 and related symbologies may be provided as part of this layer. A third layer 330 overlays the first and second layers 310, 320 and includes non-tunnel related symbology, such as, for example airspeed box 332, rate-of-climb indicators 334 and other similar symbology as needed or desired.

Figures 9, 10:
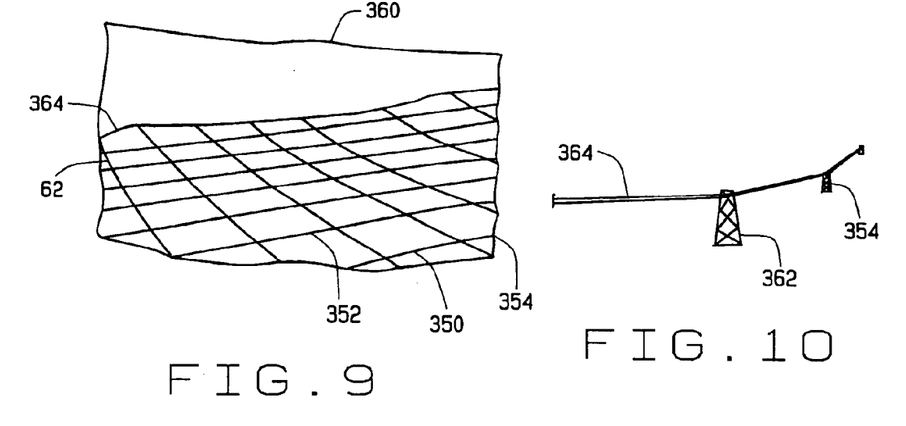
FIG. 9 is an exemplary display showing three-dimensional objects that may be provided in connection with various embodiments of a predictive flight path symbology system according to the present invention.
FIG. 10 is another exemplary display showing three-dimensional objects that may be provided in connection with various embodiments of a predictive flight path symbology system according to the present invention.

In various embodiments, using terrain data stored within the database 204, other ground features and/or a three-dimensional terrain may be provided as part of the first layer 310. For example, ground cues such as roads, railroads, rivers, lakes, fields, buildings navigational obstacles and navigational aids, among others may be provided. In particular, using terrain elevation data as described herein and feature source data (e.g., digital format imagery), three-Boeing dimensional images may be provided as part of a display displaying the predictive flight path symbology system 100. The images are preferably highlighted (e.g., color coded and/or marking designations) for easier identification. For example, as shown in FIG. 9, representations of highways 350 may be identified by color and a marking designation 352 (e.g., highway number) on the rendered terrain 354. As shown in FIGS. 9 and 10, and for further example, towers may be represented by tower shaped objects 360, with power line towers represented by solid tower-shaped objects 362 having solid lines 364 therebetween representing power lines. It should be noted that these are merely exemplary objects that may be provided on the display. For example, cities may be represented by colored areas on the rendered terrain 354 with the city name above it in three-dimensional lettering. Further, the level of detail of the displayed objects may be varied (e.g., more detailed rendering as aircraft approaches closer to the objects).

Thus, as shown in FIG. 11, a display 400 may be provided and configured having tunnel symbology, including the open tunnel bounded by broken tunnel lines 16 combined with and overlaying a three-dimensional synthetic view terrain 354, which includes three dimensional images and/or objects representing various objects on the terrain 354 (e.g., buildings 402 and a runway 404). The display 400 displaying the predictive flight path symbology system 100 in combination with a three-dimensional synthetic view terrain may be provided and configured as, for example, a six inch by six inch display field for use as part of a multi-function display (MFD) of a cockpit.

Embodiments of the present invention may provide accurate elevation and obstacle data to aircraft flight director systems to provide the pilot with immediate, real-time flight guidance information. Such a flight director system for use in connection with various embodiments of the present invention for providing a predictive flight path symbology system 10, 100 is described in co-pending U.S. patent application entitled "CONTROL SYSTEM PROVIDING PERSPECTIVE FLIGHT GUIDANCE" identified previously herein, the entire disclosure of which is hereby incorporated by reference herein.

Thus, using highly accurate data from an accurate digital map system, which is updated and correlated with the aircraft dGPS position and inertial spatial data, terrain data is provided to pilots in a real-time, anticipatory and intuitive format. Embodiments of the present invention provide flight director guidance for critical maneuvers (e.g., maneuvers with very small margins of error) having precision navigation requirements. Information provided and displayed by embodiments of the present invention include future flight path information for use by a pilot. The displayed information, including the predictive information responds to changes in pilot control input. Further, an FPV-based predictive flight path symbology system of the present invention provides pilots with an intuitive symbology set that enables the execution of steep, precision, instrument approaches in near zero visibility. The use of dGPS provides precision waypoint geolocation, and a quickened predictive FPV symbol and "tunnel-in-the-sky" pathway guidance resulting in an intuitive instrument approach guidance display system for use in, for example, rotorcraft/tiltrotor applications. Thus, embodiments of the present invention improve performance and reduce pilot workload using various guidance and display options for terminal flight operations and/or terrain flight/terrain avoidance operations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An aircraft guidance system comprising:
    a receiver for receiving aircraft position information;
    a database providing terrain information for use in combination with the aircraft position information to provide a guidance profile; and
    a display for displaying a Perspective Flight Guidance (PFG) symbology set adapted to provide predictive terrain guidance information based upon the guidance profile, wherein the PFG symbology set includes a virtual tunnel bounded by broken lines that illustrate a specified temporal amount of flight pathway to provide anticipatory flight control input cues.

2. The aircraft guidance system according to claim 1, wherein the guidance profile is a terrain following guidance profile.

3. The aircraft guidance system according to claim 1, wherein the receiver is configured to receive a dGPS signal providing the aircraft position information.

4. The aircraft guidance system according to claim 1 further comprising an air data system, and wherein terrain elevation data from the database is compared to aircraft altitude data from the air data system by an aircraft flight data processor to provide the guidance profile.

5. The aircraft guidance system according to claim 4, wherein the flight data processor is configured to compare the terrain elevation data and altitude data to a predicted or required aircraft altitude and a low altitude clearance threshold.

6. The aircraft guidance system according to claim 5, wherein the display is configured to be updated based upon the comparisons by the flight data processor.

7. An aircraft guidance system for use in terrain following flight comprising:
    a GPS receiver for receiving aircraft position information;
    an air data system providing aircraft altitude information;
    a database providing terrain information for use in combination with the aircraft position information and aircraft altitude information to generate a terrain following guidance profile; and
    a display for displaying a Perspective Flight Guidance (PEG) symbology set adapted to provide predictive terrain guidance information based upon the terrain following guidance profile, wherein the PFG symbology set includes a virtual tunnel bounded by broken lines that illustrate a specified temporal amount of flight pathway to provide anticipatory flight control input cues.

8. The aircraft guidance system according to claim 7, wherein the display is configured to provide a three-dimensional representation of the terrain guidance information.

9. The aircraft guidance system according to claim 8, wherein the display is configured to provide a time frame reference in combination with the terrain guidance information.

10. The aircraft guidance system according to claim 8 wherein the display is configured for multi-layered operation having a first layer comprising the three-dimensional representation of the terrain guidance information, a second layer comprising the virtual tunnel, and a third layer comprising navigation guidance symbology.

11. The aircraft guidance system according to claim 10 wherein the three-dimensional representation of the terrain guidance information comprises a rendered three-dimensional terrain with associated navigational obstacles.

12. The aircraft guidance system according to claim 7, further comprising a flight data processor configured to generate the terrain following guidance profile defining a three-dimensional tunnel for display.

13. The aircraft guidance system according to claim 7, wherein the display is configured for displaying updated guidance information based upon an updated terrain following guidance profile.

14. A method for providing aircraft guidance comprising:

receiving aircraft position and altitude information;

obtaining terrain elevation information;

comparing the received aircraft position and altitude information with the obtained terrain elevation data to generate a guidance profile; and displaying a representation of the guidance profile utilizing a Perspective Flight Guidance (PFG) symbology set including a virtual tunnel bounded by broken lines that illustrate a specified temporal amount of flight pathway to provide anticipatory flight control input cues.

15. The method according to claim 14, wherein the aircraft position and altitude information is provided by a GPS signal and aircraft performance is provided by inertial data and an air data system for use in updating the guidance profile.

16. The method according to claim 14, wherein the terrain elevation information is provided by an electronic terrain database.

17. The method according to claim 14, wherein the virtual tunnel further identifies aircraft position relative to terrain.

18. The method according to claim 14, further comprising updating the displayed representation based upon an updated guidance profile.

19. The method according to claim 14, further comprising using a tunnel code to generate the guidance profile based upon inputs defined by the aircraft position and altitude information and the terrain elevation information.

* * * * *